US006006423A

United States Patent [19]

Schriever

[11] Patent Number: 6,006,423

[45] Date of Patent: Dec. 28, 1999

[54] HAND PRESS FOR ATTACHING FASTENERS

[75] Inventor: Frederick G. Schriever, Grosse Pointe Woods, Mich.

[73] Assignee: Snapfast Industries, Inc., Detroit, Mich.

[21] Appl. No.: 09/218,236

[22] Filed: Dec. 22, 1998

[51] Int. Cl.$^{6}$ ..................................................... B23P 19/00

[52] U.S. Cl. .......................... 29/798; 29/275; 29/243.517

[58] Field of Search .............................. 29/275, 276, 270, 29/243.517, 243.53, 243.56, 798, 432.1, 513, 453; 227/15

[56] References Cited

U.S. PATENT DOCUMENTS

| | | |
|---|---|---|
| 1,487,543 | 3/1924 | Dingwall . |
| 2,413,702 | 1/1947 | Fenton . |
| 2,920,325 | 1/1960 | Janes et al. . |
| 3,145,388 | 8/1964 | Carpinella . |
| 3,483,603 | 12/1969 | Briskin . |
| 3,517,874 | 6/1970 | Cressy . |
| 4,189,822 | 2/1980 | Perline et al. ............................ 29/453 |
| 5,282,303 | 2/1994 | Schriever ............................... 29/432.1 |
| 5,285,557 | 2/1994 | Schriever ................................. 24/662 |
| 5,419,035 | 5/1995 | Twigg ..................................... 29/798 |
| 5,535,506 | 7/1996 | Chalfin .................................... 29/798 |
| 5,636,427 | 6/1997 | Lyle ......................................... 29/453 |

*Primary Examiner*—David P. Bryant
*Attorney, Agent, or Firm*—Brooks & Kushman P.C.

[57] ABSTRACT

An inexpensive hand press for attaching fasteners to a fabric or web comprises a pair of A-shaped legs made of molded plastic and joined by a living hinge at their wider ends. The narrower ends are adapted to carry the fastener parts which are to be secured together by folding the legs toward each other on opposite sides of the fabric and then striking one of the ends with a hammer while supporting the corresponding end of the other leg on a suitable support.

9 Claims, 2 Drawing Sheets

HAND PRESS FOR ATTACHING FASTENERS

TECHNICAL FIELD

This invention relates to hand-operated presses for attaching fasteners to fabric.

BACKGROUND ART

The assignee of this invention is the owner of U.S. Pat. Nos. 5,282,303; 5,285,557; and others. These patents show a snap fastener for application to fabrics or other web-type materials, as well as tooling for applying the fasteners to the fabric or web. These two patents are incorporated in this application by reference.

While the fastener and tooling shown in these patents is enjoying commercial success, the tooling for applying the fasteners is designed for commercial use and, accordingly, more expensive than desirable where a persona intends to attach but a few fasteners. No tooling is available for applying fasteners of the type shown in the aforesaid patents by the do-it-yourselfers for small jobs, such as anywhere from one or two to a dozen fasteners. Because of this, the general public has not been able to easily install this type of fastener.

SUMMARY OF THE INVENTION

The primary object of this invention is to provide an inexpensive hand press for attaching cooperating parts of a fastener to a fabric or web using a striking tool, such as a hammer.

Another object is to provide a press, for attaching cooperating fastener parts to a fabric or web, whose cost is sufficiently low that the average person wishing to utilize snap fasteners may afford the cost of the press.

In carrying out the invention, I provide a press comprising a pair of A-shaped legs made of plastic and connected together at their wider ends by a living hinge. The narrower ends of the legs are adapted to carry the cooperating fastener parts and hold them in proper alignment on opposite sides of the fabric so that by striking the narrower end of one of the legs with a hammer while supporting the other leg on a support surface, the cooperating parts of the fastener will not only be pressed through the fabric or web but will properly engage and lock into the cooperating fastener part in the opposite leg. The cost of a press made in this fashion is substantially less than the cost of presses of the kind shown in the aforementioned patents and, accordingly, this manual or hand press will be affordable by the general public for small fastener-attaching jobs.

BRIEF DESCRIPTION OF PREFERRED EMBODIMENT

Figure 1:
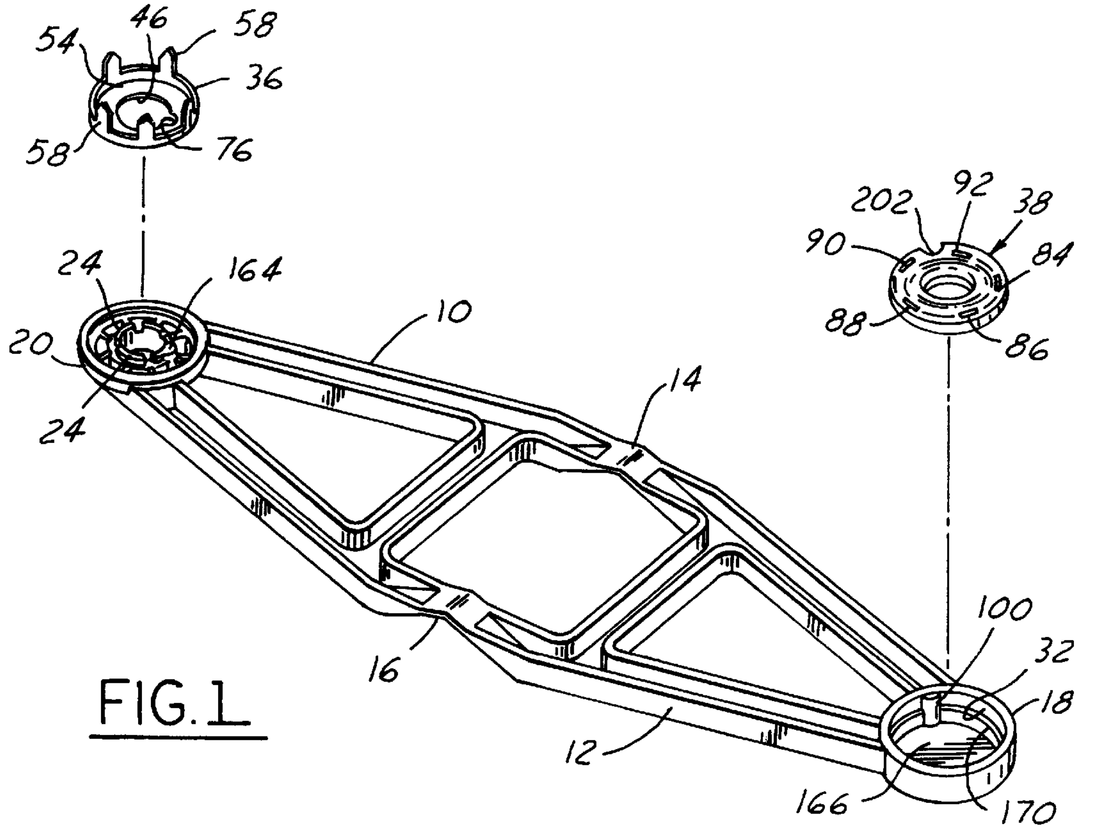
FIG. 1 is a perspective view of a hand press embodying the invention.
Figure 2:
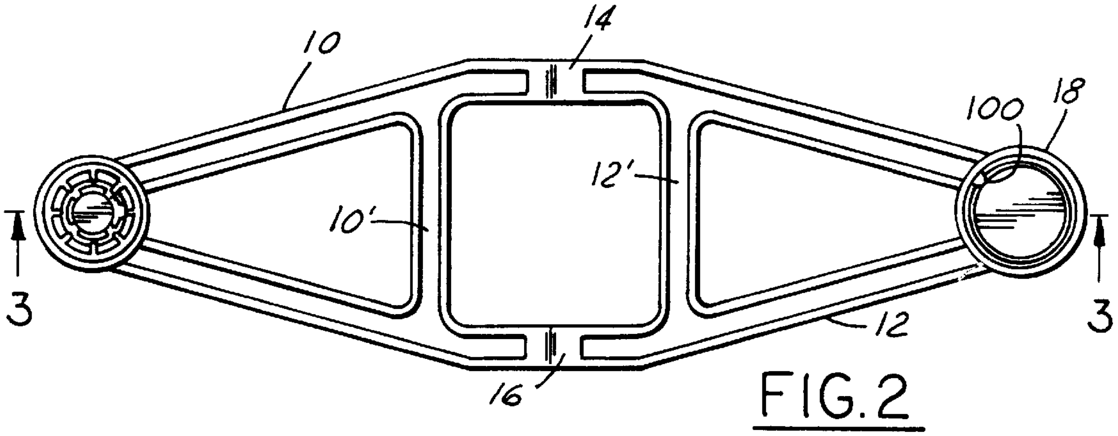
FIG. 2 is a plan view of the press shown in FIG. 1.
Figure 3:
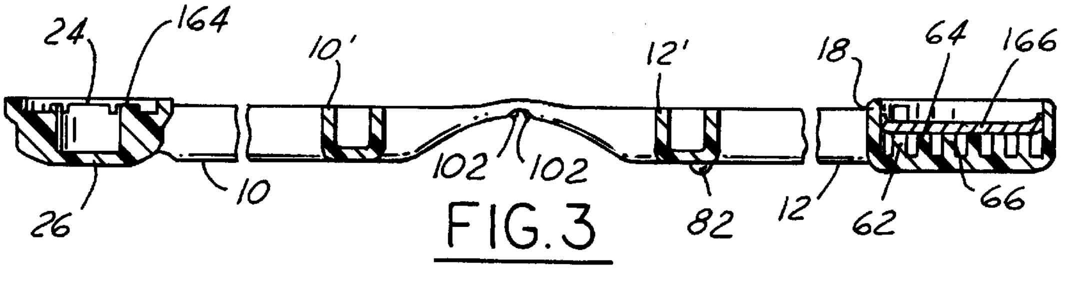
FIG. 3 is a cross-sectional view taken on the line 3—3 of FIG. 2.
Figure 4:
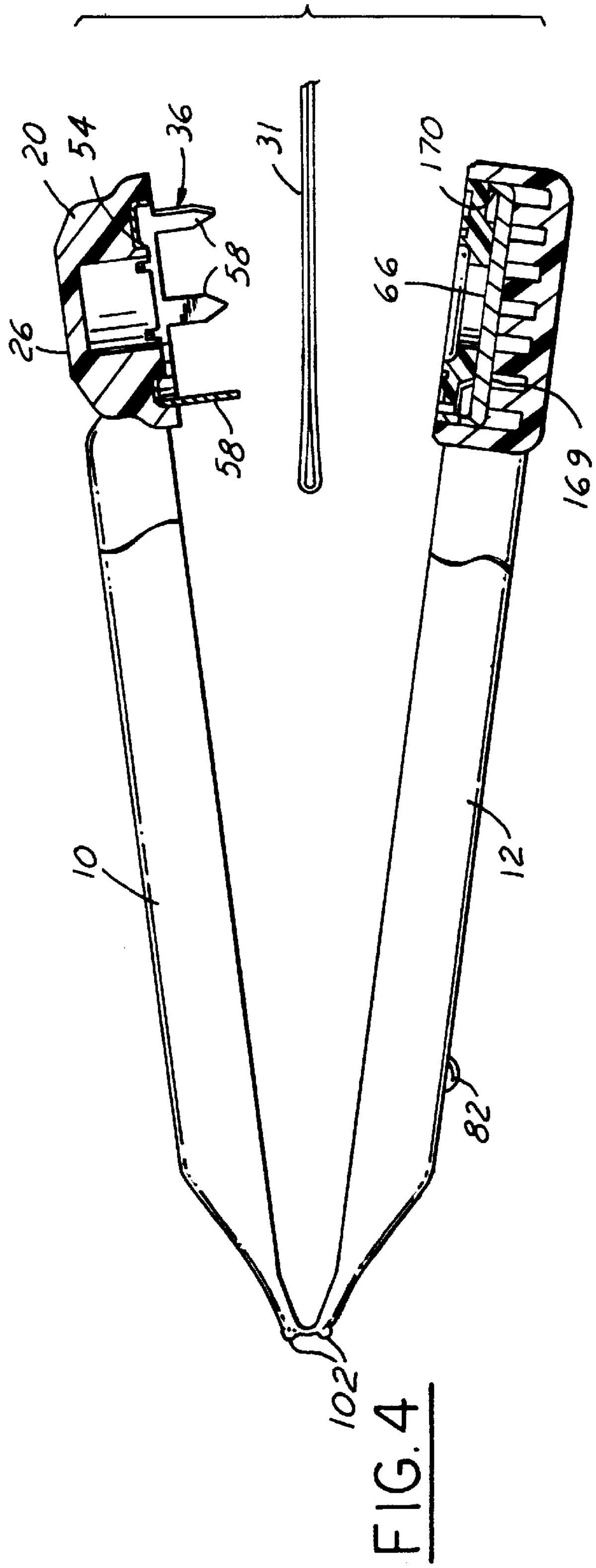
FIG. 4 is a side elevation partly in section showing the press with cooperating fastener parts disposed thereon with a fabric or web disposed between such parts ready to receive the parts in forming a fastener.
Figure 5:
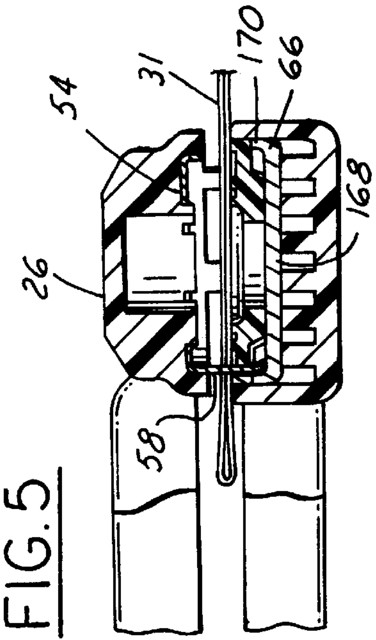
FIG. 5 is a cross-sectional view with press of FIG. 4 closed against the fabric and with the prongs of the prong cap projecting through the fabric or web and through the apertures of the receiver, but before crimping.
Figure 6:
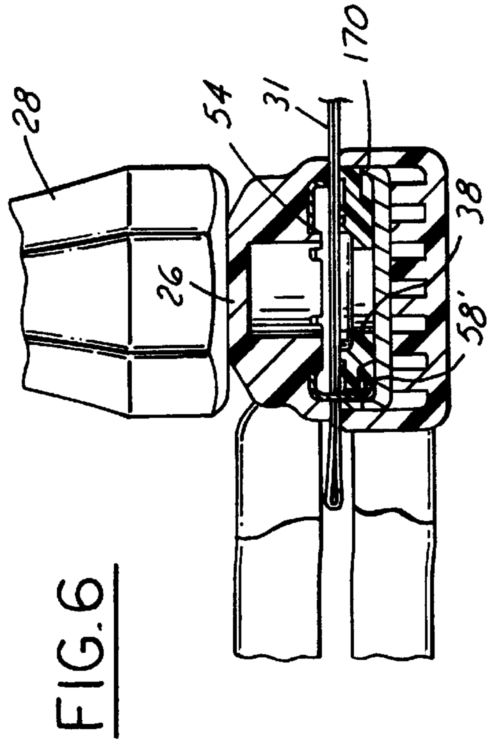
FIG. 6 is a cross-sectional view similar to FIG. 5 but with a hammer or other striking tool having crimped the prong cap against the receiver.

As shown in the drawings, the press comprises a pair of A-shaped legs 10 and 12 hinged together at their wider ends as at 14 and 16 such that the legs may rotate from the positions shown in FIGS. 1, 2 and 3 to that of FIGS. 4, 5 and 6. Preferably, the legs are injection molded of plastic and the hinges 14 and 16 are living hinges formed at the time of the injection molding. Any suitable plastic may be used for the legs including 12% glass-filled polypropylene.

Each leg is of channel-shaped formation, the channels being U-shaped in cross-section. This configuration of the legs gives them considerable strength. Cross members 10' and 12' are provided as integral parts of each leg.

The living hinges at 14 and 16 at the wider ends of the A-shape are designed to ensure that the folding of the legs toward each other is accomplished without deviation so that the narrower ends 18 and 20 will approach each other in exact alignment, i.e., without any wobble or slop in the hinges which would lead to misalignment of the narrow ends 18 and 20. The need for accurate alignment of the ends is the result of the need to ensure cooperation of the fastener parts as they are assembled to each other and to the canvas or web.

While the press may be used to attach other fasteners, it was particularly designed for applying the fastener shown in U.S. Pat. 5,285,557.Such fastener comprises a prong cap or tooth cap 36. Desirably, it is made of stainless steel so that it will not corrode in use and will provide adequate strength. It has a plurality of equa-angularly spaced prongs or teeth 58 which are intended to be received through equa-angularly spaced apart slots 84, 86, 88, 90 and 92 in the cooperating member or receiver 38. The prong cap or tooth cap is provided with a notch 76 for reception over and cooperation with a semi-circular projection 164 at the end 20 of the leg 10 to rotatably align the prong cap on the press. In fact, the narrow end of the leg 10 is provided with a socket within which the prong cap is received as shown in FIG. 4. The socket, to support the prong cap in accurate position on the press, includes small ribs 22 which extend radially to underlie the prong cap and circumaxial rib segments 24 which project above the ends of the ribs 22 to be received within the inner peripheral edge 46 of a central opening in the cap. The peripheral edge 46 is interrupted by the aforesaid notch 76 to be received over the semi-circular pin-like projection 64 which is integral with the circular ribs 24. The circumaxial ribs 24 are sized to be a light press fit within the central aperture of the prong cap to engage the inner peripheral edge 46 to hold the prong cap within the socket at the end 20 of the leg 10 in exact alignment with a receiver in the opposite leg of the press.

The narrowed end of the leg 10 on the opposite side from the outwardly opening socket with its circular ribs 24 is provided with a hammer striking surface 26 for impact by hammer 28 or other striking tool. The force of the hammer will be delivered directly to the prong cap when the legs of the press have been folded to the position shown in FIGS. 5 and 6.

From a review of the drawings, it will be noted that the prong cap is snugly received within the socket at the narrowed end 20 of the leg 10 and, thus, is supported around its circumference and across its annular back portion 54.

The narrowed end 18 of the leg 12 is shaped to provide a circular socket 32 which opens toward the prong cap receiving socket of leg 10 when the legs are folded to the position shown in FIGS. 4–6. The socket 32 is provided with a semi-circular projection 100 which is intended to cooperate with the notch 202 in the receiver 38 and thereby rotatably position the receiver within the socket 32. The positioning is such that the prongs 58 will be received through the slots 84, 86, 88, 90 and 92 of the receiver.

The socket 32 is adapted to receive an insert or die member 166 having a generally flat outside bottom wall 169 with a peripheral upstanding lip 170.

The inside of the die may be similar to the surfaces 116 and 120 of the die 62 shown in FIG. 11 of U.S. Pat. No. 5,282,303 so that the prongs 58 will curl radially inwardly and upwardly against the bottom of the retainer as best shown at 58' thus crimping the cooperating fastener parts together and holding them securely to the canvas or web 31. The die 166 is provided with a notch in the peripheral flange 170 which is received over the semi-circular pin 100 in the socket 32. The socket and die 166 are sized to be a press-fit so that the die will not fall out of the socket. The die may be formed of powdered metal.

As will be noted from FIG. 3, the socket 32 is provided with concentric ribs 62, 64 and 66 which underlie the die member 166. The concentric ribs are integral with the narrowed end 18. These concentric ribs underlie a surface 68 adapted to rest upon any suitable support, such as a workbench, the floor of a building or the like, to support the end 18 and associated die as well as the retainer member during attachment of the fastener to the fabric or web. To facilitate stable support of the press on the supporting surface, and to obviate slight unevenness of the supporting surface, the leg 12 is provided with a pair of projections 82 (only one being shown) as depicted in FIG. 3 on the same side of the leg as the striking surface 68. The projections 82 are disposed on the cross member 12' of the A-shaped leg. Thus, a three-point contact is made between the press and the surface upon which it rests during securement of the fastener to the fabric and prevents wobbling thereof.

To prevent the legs from being folded against each other in the wrong direction and thus prevent unnecessary wear of the living hinges, a pair of stops in the form of nubbins 102 are provided on the legs immediately adjacent the living hinges as shown in FIGS. 3 and 4 which will contact each other to prevent swinging the legs in the wrong direction.

In using the press, the cooperating parts of the fastener are placed in the sockets in the narrowed ends of the legs, the prong cap being retained by the circular ribs 24 and the receiver member 38 being held by the slight interference fit of the semi-circular pin-like projection 100 received in the notch 202 as well as the light-press fit of the receiver within the socket 32. The legs are then swung to the position shown in FIG. 4 and positioned on opposite sides of the fabric or other web in the location where the fastener is to be attached. The operator then squeezes the legs toward each other bringing the prongs 58 into contact with the fabric. If the legs are squeezed together sufficiently, the prongs will be caused to penetrate through the fabric and enter the slots. If the fabric or web is particularly tough, it may be desirable to place the press on the supporting surface, bring the prong cap down against the fabric and then strike the surface 26 with the hammer 28 to simultaneously drive the prongs 58 through the fabric, through the slots and cause the prongs to be crimped by the die 66 against the underside of the receiver. Whether the fabric is tough or not, the prongs are crimped against the receiver by striking one end of the press while holding the opposite end on a rigid support. The press may then be simply opened and the prong cap and receiver will slide off of the legs.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. An inexpensive hand press for attaching cooperating parts of a fastener to a web using a striking tool comprising, in combination:

a pair of A-shaped plastic legs connected together at the wider ends by an integrally molded living hinge for swingable movement of the narrower ends of the legs toward and away from each other;

the narrower ends of said legs configured to receive and hold cooperating parts of a fastener and carry the same into confronting and aligned opposition on opposite sides of a web disposed therebetween upon manually swinging the legs toward each other; and the narrower end of one of said legs having a surface adapted to rest on a support and the narrower end of the other leg having a surface adapted to be struck by a striking tool to drive together the cooperating parts of the fastener carried by the legs and secure the same to a web disposed therebetween.

2. The invention defined by claim 1 further comprising a crimping die mounted on the narrower end of one of the legs.

3. The invention defined by claim 2 wherein said die is metal.

4. The invention defined by claim 2 wherein said die is formed of powered metal.

5. The invention defined by claim 2 wherein the crimping die and the narrowed end of the leg mounting it have cooperating portions for holding the die in a fixed non-rotatable position in relation to the leg, and the narrowed end of the other leg has a portion for interfitting engagement with a cooperating part to be mounted on such leg to hold the same in a fixed non-rotatable position in relation to the die.

6. The invention defined by claim 5 wherein said crimping die is fitted into a socket formed in the narrowed end of the leg mounting it, and said socket has a portion for interfitting engagement with a cooperating part of a fastener to hold such part in a fixed non-rotatable position in relation to the cooperating part mounted on the other leg.

7. The invention defined by claim 1 wherein said leg having the surface adapted to rest on a support includes a three point leg supporting configuration comprising said surface and a pair of projections adjacent the hinge.

8. The invention defined by claim 1 wherein stops are provided on said legs for preventing swing of the legs toward each other in an opposite direction.

9. The invention defined by lcaim 8 wherein said stops comprise nubbins on each leg adjacent the hinge connection between the legs.

* * * * *